US012388183B2

(12) United States Patent
Williams et al.

(10) Patent No.: US 12,388,183 B2
(45) Date of Patent: Aug. 12, 2025

(54) RUBIDIUM SPIN EXCHANGE RELAXATION FREE MAGNETOMETER BASED RECEIVER

(71) Applicant: The Boeing Company, Arlington, VA (US)

(72) Inventors: John Dalton Williams, Decatur, AL (US); Michael F. Mitchell, Madison, AL (US); Timothy Doyle Messer, Huntsville, AL (US); Allon Joseph Stern, Leesburg, VA (US)

(73) Assignee: The Boeing Company, Arlington, VA (US)

( * ) Notice: Subject to any disclaimer, the term of this patent is extended or adjusted under 35 U.S.C. 154(b) by 161 days.

(21) Appl. No.: 18/183,380

(22) Filed: Mar. 14, 2023

(65) Prior Publication Data

US 2024/0313403 A1 Sep. 19, 2024

(51) Int. Cl.
*H01Q 7/08* (2006.01)
*H01Q 1/38* (2006.01)

(52) U.S. Cl.
CPC ................. *H01Q 7/08* (2013.01); *H01Q 1/38* (2013.01)

(58) Field of Classification Search
CPC .. H01Q 7/08; H01Q 1/38; H01Q 1/36; H01Q 7/00
See application file for complete search history.

(56) References Cited

U.S. PATENT DOCUMENTS

2005/0128014 A1* 6/2005 Matsuura .................. H01S 1/06 331/86
2011/0181290 A1* 7/2011 Kuzmin ................... G01V 3/17 324/331
2015/0349790 A1* 12/2015 Maki ......................... H03L 7/26 331/94.1
2017/0136906 A1* 5/2017 Draeger ............... G01D 5/2006
2020/0057116 A1* 2/2020 Zorzos ................. G01R 33/032

* cited by examiner

*Primary Examiner* — Alvaro E Fortich
(74) *Attorney, Agent, or Firm* — Yee & Associates, P.C.

(57) ABSTRACT

A very low frequency (VLF) receiver is provided. The VLF receiver comprises a magnetometer that detects a magnetic field, wherein the magnetometer comprises a rubidium gas cell. Processing circuitry receives an electrical signal representative of VLF electromagnetic signals detected by the magnetometer. A multi-axis array encloses the magnetometer. The multi-axis array comprises a number of inductive coils. A closed loop current controller is connected to the inductive coils and runs on the processing circuitry. The closed loop current controller controls the magnetic field strength of the inductive coils to maintain a uniform magnetic field across the rubidium gas cell to allow the processing circuitry to detect the VLF electromagnetic signals.

20 Claims, 7 Drawing Sheets

RUBIDIUM SPIN EXCHANGE RELAXATION FREE MAGNETOMETER BASED RECEIVER

BACKGROUND INFORMATION

1. Field

The present disclosure relates generally to electromagnetic receivers, and more specifically to a tuned multi-coil array that maintains a uniform magnetic field.

2. Background

Magnetic induction is the most compact means of recording electromagnetic waves from a distance. Almost all very low frequency (VLF) receivers today are made of loop antennas. Each loop induces current that is amplified by the number of loops and the permeability of the ferrite often placed within them. The received current is coupled to the incident electromagnetic (EM) wave by its magnetic component, not the electric one, allowing insulated loop inductors to receive data. Loop current antennas are typically meters in size and have limited gain. Loop antennas with ferrite cores are smaller, typically a few feet, but still have limited gain.

Therefore, it would be desirable to have a method and apparatus that take into account at least some of the issues discussed above, as well as other possible issues.

SUMMARY

An illustrative embodiment provides a very low frequency (VLF) receiver. The VLF receiver comprises a magnetometer that detects a magnetic field, wherein the magnetometer comprises a rubidium gas cell. Processing circuitry receives an electrical signal representative of VLF electromagnetic signals detected by the magnetometer. A multi-axis array encloses the magnetometer. The multi-axis array comprises a number of inductive coils. A closed loop current controller is connected to the inductive coils and runs on the processing circuitry. The closed loop current controller controls the magnetic field strength of the inductive coils to maintain a uniform magnetic field across the rubidium gas cell to allow the processing circuitry to detect the VLF electromagnetic signals.

Another illustrative embodiment provides a VLF receiver. The VLF receiver comprises a magnetometer that detects a magnetic field, wherein the magnetometer comprises a rubidium gas cell. A buckyball-shaped frame encloses the magnetometer. A number of inductive coils are mounted on the buckyball shaped frame, wherein the inductive coils form a multi-axis array. A high bit resolution analog to digital converter (ADC) receives an electrical signal representative of VLF electromagnetic signals detected by the magnetometer. A single board computer receives a digital signal from the ADC and applies a neuromorphic denoiser to improve signal to noise ratio. A closed loop current controller is connected to the inductive coils and runs on the single board computer, wherein the closed loop current controller controls magnetic field strength of the inductive coils to maintain a uniform magnetic field across the rubidium gas cell to allow the ADC to detect the VLF electromagnetic signals.

Another illustrative embodiment provides a multi-axis inductive coil array. The multi-axis inductive coil array comprises a number of inductive coils and a closed loop current controller connected to the inductive coils, wherein the closed loop current controller controls magnetic field strength of the inductive coils to maintain a uniform magnetic field within the multi-axis array.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
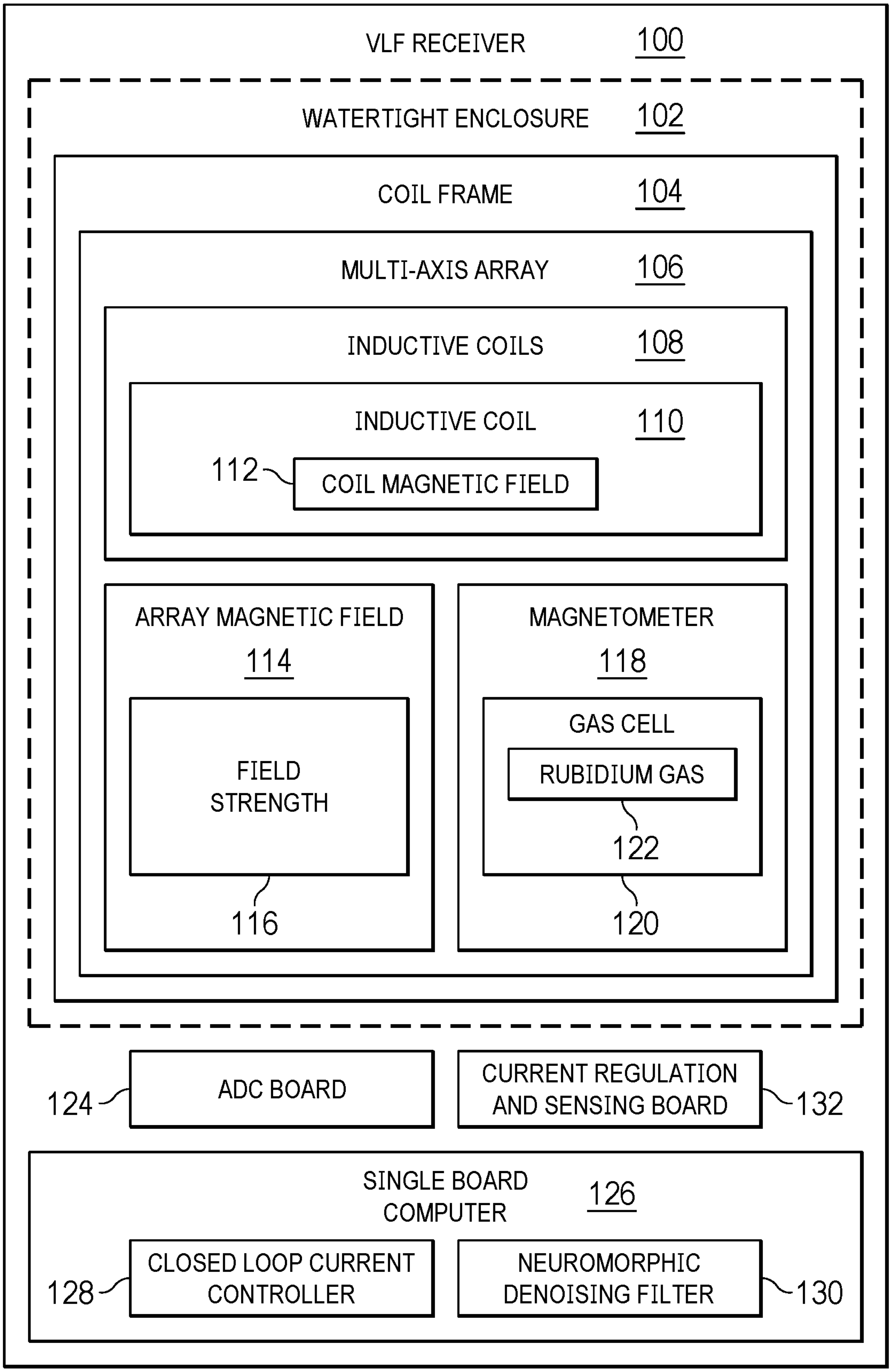
FIG. 1 depicts a block diagram of VLF receiver in accordance with an illustrative embodiment.

The illustrative embodiments recognize and take into account a number of different considerations as described herein. The illustrative embodiments recognize and take into account that magnetic induction is the most compact means of recording electromagnetic waves from a distance. Almost all VLF receivers today are made of loop antennas. Each loop induces current that is amplified by the number of loops and the permeability of the ferrite often placed within them. The received current is coupled to the incident electromagnetic (EM) wave by its magnetic component, not the electric one, allowing insulated loop inductors to receive data.

The illustrative embodiments also recognize and take into account that loop current antennas are typically meters in size and have limited gain. Loop antennas with ferrite cores are smaller, typically a few feet, but still have limited gain.

The illustrative embodiments also recognize and take into account that magnetic coupling of light is far more important than most realize. Light absorption does not always affect the primary atomic state (N) but often the secondary states (L and M) by coupling angular momentum from the magnetic component of the EM wave to the electron which in turn induces magnetic transitions within the atom. One could argue that kinetic oscillations (phonon) within an atomic lattice create similar magnetic states. Thus, while momentum transfer in magnetism is more difficult to understand, it is probably the primary means by which light and sound excite the atomic world. Therefore, the ideal measurement of the smallest electromagnetic energy transfer, or EM signal transduction, allowed is the measure of magnetic field.

The illustrative embodiments provide a VLF receiver comprising a quantum magnetometer enclosed in a multi-axis array of inductive coils enclosed into a single, water-tight modular unit. A closed loop controller controls the bias of the inductive coils, and a single board computer runs radio and data analysis.

Currently, the most accurate sensor available at or near room temperature is an alkali gas spin exchange relaxation free (SERF) magnetometer. This device uses light to excite all the atoms in a diffuse gas enclosed within a glass box to a single excited state. When an EM field penetrates the glass box, the atoms within are inductively coupled and their angular momentum (inductive state) is changed. The excitation of angular momentum can be observed in the polarization of the light passed through the cell. Therefore, an EM wave is observed without electronic losses or thermal noise present in conductive materials. Without the losses present in conductors, sensitivities of femtoTesla instead of microTesla can be achieved within a volume 10,000 times smaller than a conventional inductive loop.

At present there are three primary means to communicate effectively in saltwater environments. First is VLF radio transmit and receive. The second is laser communications, and the third is sound wave propagation. Each offers distinct benefits. Blue-green lasers are good point to point communication systems but require precise beam steering and constant location data. Sonic buoys dissipate over long distances, but do not efficiently penetrate the air water barrier efficiently. VLF propagation is range limited in sea water, but propagates long in air, does not require line of sight, and efficiently passes through the air water interface.

Another potential application of a VLF receiver is recording atmospheric disturbances between 300 Hz and 25 kHz. At these frequencies, the Antarctic research stations often record lightning and other short term events for thousands of miles. By strategically placing and timing events over large distances, it is possible to record the plasma generated during the atmospheric reentry of satellites, vehicles, and rockets.

FIG. 1 depicts a block diagram of a VLF receiver in accordance with an illustrative embodiment.

VLF receiver 100. Multi-axis array 104 comprises a number of inductive coils 108 mounted on a coil frame 104. Multi-axis array 104 encloses magnetometer 112. Each inductive coil 110 has a respective coil magnetic field 112 with a respective field strength.

Multi-axis array 106 has an array magnetic field 114 created by the inductive coils 108. The field strength 116 the of array magnetic field 114 is determined by the shape of the multi-axis array 106 and the coil magnetic field 112 of each individual coil 110, which can be dynamically tuned by a closed loop current controller 128. Array magnetic field 114 and its field strength 116 are the sum of the individual coil magnetic fields of the inductive coils 108 in multi-axis array 106. The inductive coils 108 might comprise three-axis Helmholtz coils that are tuned by the closed loop current controller 128.

Magnetometer 118 comprises a gas cell 120 containing rubidium gas 122. Gas cell 120 may be made of glass, silicon, or other nonreactive material with transparent windows to allow for the transmission and recording of optical signals. The magnetometer 118 might comprise a spin exchange relaxation free magnetometer.

An analog-to-digital converter (ADC) board 124 receives an electrical signal representative of VLF electromagnetic signals detected by the magnetometer 118. The ADC board 126 might comprise a high bit resolution (e.g., 24-bit) sound board that digitizes an analog signal up to 50 KHz.

Single board computer (SBC) 126 reads signal inputs and operates command functions continuously. SBC 126 might comprise, e.g., a Raspberry Pi 4, field programmable gate array (FPGA), or other single board processing unit with similar computing power and memory. SBC 126 is connected to the inductive coils 108 and runs a closed loop current controller 128 which controls the coil magnetic field 112 of each inductive coil 110 to maintain a uniform field strength 116 of array magnetic field 114 across the rubidium gas cell. The closed loop controller 128 nullifies the Earth's magnetic field and spurious local fields across the interior of the gas cell 120 containing the rubidium gas 122. This uniform field strength allows the ADC board 124 to detect the VLF electromagnetic signals. The closed loop controller 126 might employing machine learning to tune the field strength 116 of array magnetic field 114.

SBC 126 uses an operating system that can load a software based neuromorphic denoising filter 130 that boosts signal to noise ratio (SNR) by at least 40 dB above the noise floor and decoded.

A current regulation and sensing board 132 regulates current across multiple channels.

For underwater applications, the coil frame 104, inductive coils 108 and magnetometer 118 can be enclosed in a watertight enclosure 102.

Figure 2:
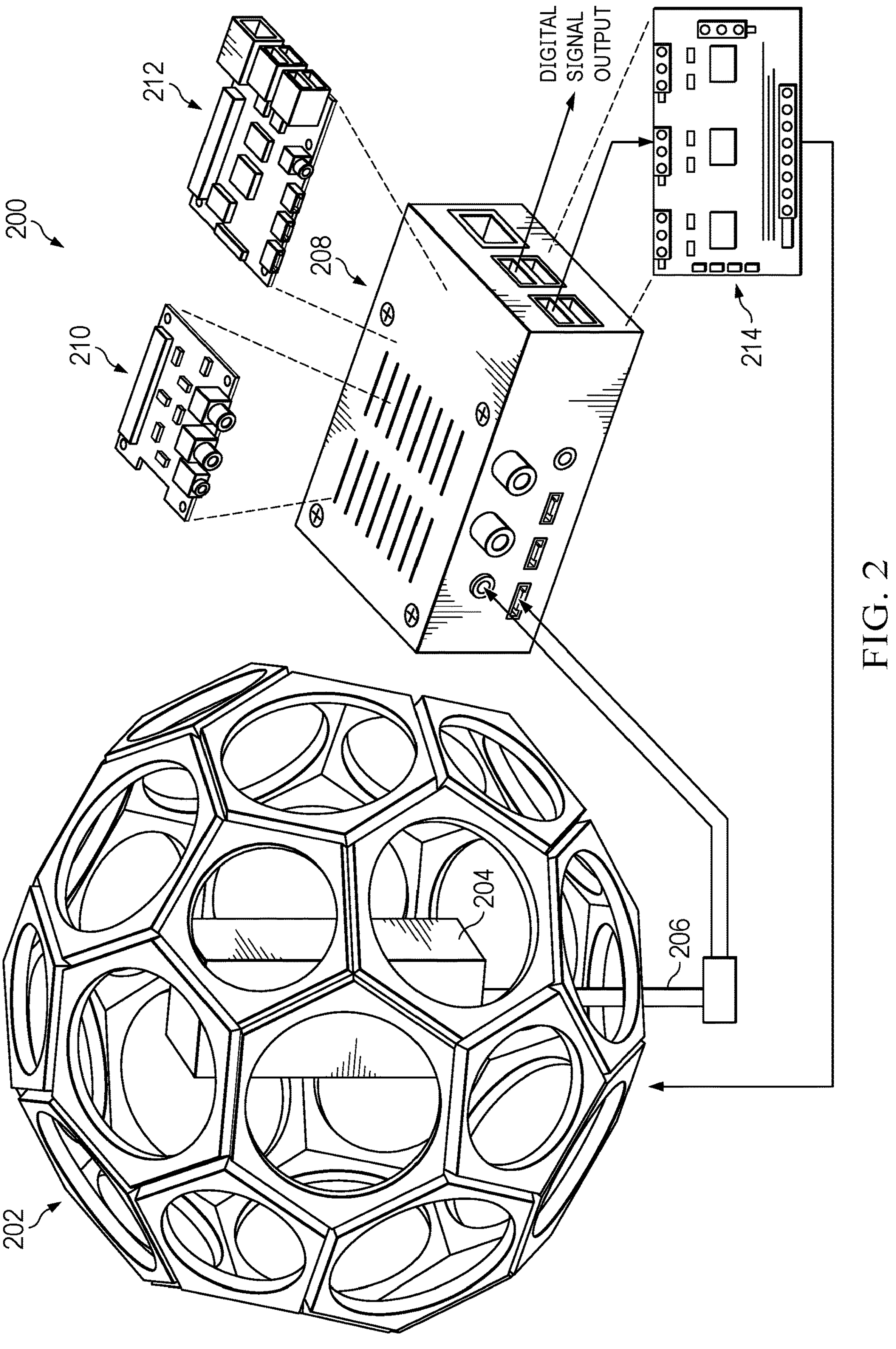
FIG. 2 depicts a pictorial diagram of a VRSMR in accordance with an illustrative embodiment.

FIG. 2 depicts a pictorial diagram of a Very Low Frequency (VLF) Rubidium (Rb) Spin Exchange Relaxation Free (SERF) Magnetometer Receiver (VRSMR) in accordance with an illustrative embodiment. VRSMR 200 is an example implementation of VLF receiver 100 in FIG. 1.

The VRSMR 200 provides several innovations that optimize the system during operation. These innovations improve the overall performance characteristics of the VRSMR receiver module while supporting a low Size, Weight, and Power (SWAP) and performance. The VRSMR of the illustrative embodiments has the ability to record real-time minimum shift key (MSK) signal modulation. The VLF Rb SERF magnetometer of VRSMR is able to detect kHz signals. The VRSMR also optimizes the symmetry of the magnetic field to maintain magnetic field uniformity across the Rubidium gas cell. The VRSMR may also incorporates a neuromorphic denoising filter software installed on a single board computer.

In the present example, VRSMR 200 utilizes a Buckyball design frame 202 for the inductive coil array in which SERF magnetometer 204 in enclosed as shown. The term buckyball is derived from buckminsterfullerene, which is a carbon molecule with a cage-like fused ring structure made of twelve pentagons and twenty hexagons and resembling a soccer ball/football.

Coil placement on the Buckyball frame 202 can be determined using a multi-degree-of-freedom machine learning model and a closed loop optimizer for the current controller, such as closed loop current controller 128 in FIG. 1.

The illustrative embodiments model various aspects of the three-axis Helmholtz coil design to minimize non-uniformity of the magnetic field within the rubidium cell in magnetometer 204 and improve signal to noise ratio (SNR) by an additional 10 dB. This modeling optimizes the magnetic field amplitude and uniformity across the Rubidium cell required for signal reception. Without field optimization one can record laboratory signals but may not be able to remove local magnetic field biases and noise contributors required to isolate the VLF communication signal.

Compact digitally tunable current sources can be applied to geometric changes in the magnetic field of the coil array to reduce the field variation between the optimized coil inputs. The illustrative embodiments can apply Miller orientations [100], [110], and throughout the Rubidium cell when biased using 1-, 2-, and 3-dimensional Helmholtz coils. Lightweight magnetic shielding around the coil array reduces local magnetic effects. These approaches reduce the random field noise present in the Rubidium cell by up to 90% over conventional square 3D Helmholtz coil designs.

The improved design optimizes SWAP characteristics and performance of the VRSMR using either current or future RF Alkali gas magnetometers. The overall size of the VRSMR 200 and electronics shown in FIG. 2 can be smaller than a 4" diameter cylinder, 6" tall (~75 $in^3$) with femtotesla resolution.

Figure 4:
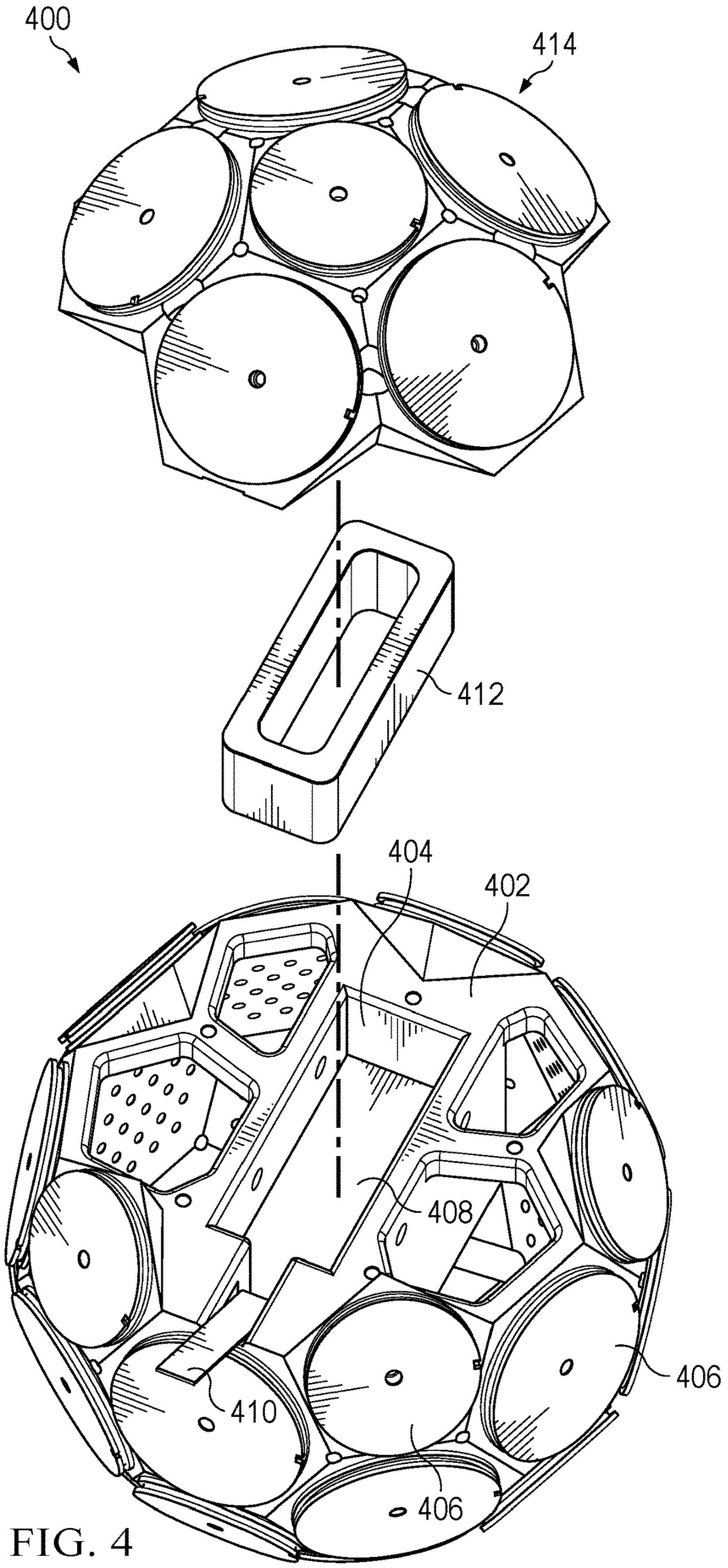
FIG. 4 depicts an exploded view of a VRSMR assembly in accordance with an illustrative embodiment.
Figure 5:
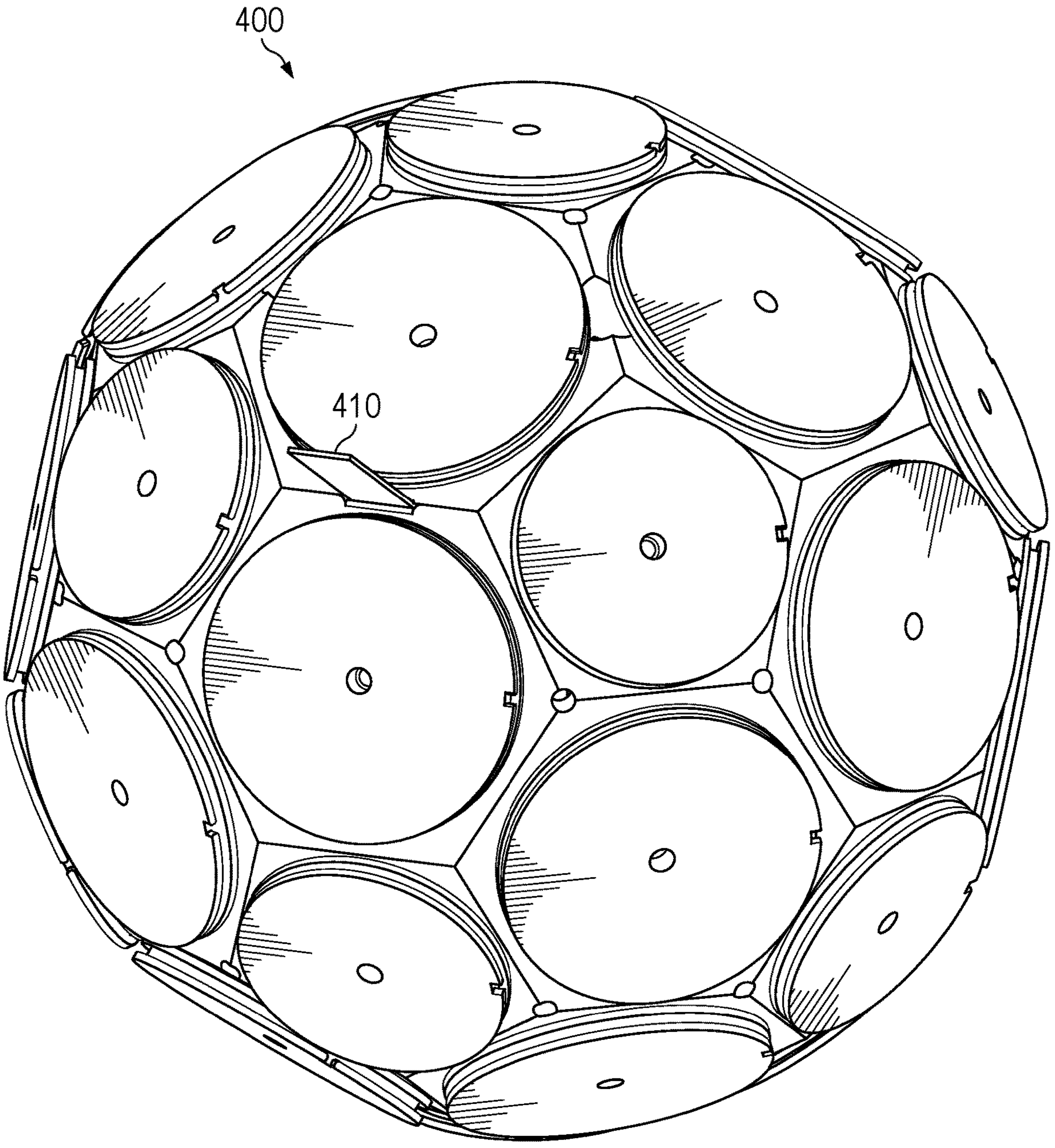
FIG. 5 depicts a pictorial diagram of a closed VRSMR assembly in accordance with an illustrative embodiment.

The VLF receiver subsystem comprise a magnetometer 204 surrounded by a spherical multi-axis shaped array of inductive coils mounted on frame 202 (see coils 406 in FIGS. 4 and 5). The inductive coils are driven by a closed loop current controller running on SBC 212 to nullify the Earth's magnetic field and spurious local fields uniformly throughout the interior of the Rubidium (Rb) gas cell, thereby locking the magnetometer 204 (i.e., optimized for settings according to the magnetometer's own internal closed loop control system). The closed loop current controller can use the machine learning algorithm to optimize the operation of more than three inductive coils at once. The addition of more coils provides a more uniform distribution of magnetic field within the cubic Rubidium glass cell of magnetometer 204, thereby increasing overall sensor sensitivity.

The use of a symmetric coil 3-axis distribution actually focuses the field at the center and not the edges of the Rubidium gas cell. Therefore, the multi-axis array is tailored to "blur" the magnetic field across the gas cell uniformly. Thus, magnetic field variations in corners of the cubic cell, Rb gas condensation sites, and local area non-uniformities in the cell can be optimized for in order to improve the signal to noise ratio of the sensor. This blurring requires solving a parametric problem with at least 7-8, and possibly more than a dozen, parameters. A machine learning approach can be used that utilizes the existing physical model to optimize a solution and compare results to minimize the signal noise floor using real-time closed loop current control.

Magnetic sensor data from the magnetometer 204 is sent via cable 206 to a high bit resolution input analog-to-digital converted (ADC) sound board 210 with a sufficient sampling rate to distinguish the channel of interest for optimal signal processing (i.e., at least 2-4x channel frequency). After analog to digital conversion, the VLF signal is sent to SBC 212 where it can be passed through the Neuromorphic Denoiser to improve signal to noise ratio (SNR) by at least 40 dB above the noise floor and decoded. The SBC 212 processes the message then transmits it to the next subsystems (not shown). SBC 212 might comprise, e.g., a Raspberry Pi 4.0 SBC. ADC board 210 and SBC 212, along with a current regulation and sensing board 214, can be housed in a single case 208.

The denoiser provides an effective improvement to the resolved signal which equates to improved dBfT (femtotesla signal resolution) to resolve weak incoming VLF signals due to electrical storms, solar flares, or depth of the receiver itself. The denoiser may also be able, and particularly with the blind source separator proven with the denoiser for electronic support measures (ESM), to demodulate and decode VLF transmissions. The denoiser has proven itself very effective in recognizing a changing signal, including both phase and amplitude changes as well as de-spreading linear frequency modulations.

A neuromorphic prediction engine uses input signals to predict a small future time-step by minimizing a quadratic objective function that represents reservoir outputs as linear combinations of historical reservoir states. Since noise is random and unpredictable, the predicted signal will be free of noise. To minimize the error function at the input sample rate, the prediction engine can combine online gradient descent with finite element methods, obtaining a discretized de-noising algorithm. For the needs of VLF communications, this may be realized on a Raspberry Pi at 200 kHz. Combining the filtering improvement with the RF magnetometer configuration presented above provides sufficient signal capture capability without the use of high power amplifier electronics.

Some applications might require continuous signal reception. To achieve this requirement in a remote mobile unit, all subsystems are optimized to use the least amount of power. The power to run the neuromorphic filter on a small SBC is estimated to be between 0.9 Watts to 3.6 W. The next highest power consumer is the sensor closed loop current controller 214, which might require 2.2 Watts for routine operation and up to 5.1 Watts of peak power over a 30 second time period to recalibrate the sensor if it loses lock on the magnetic field. The magnetic coils require approximately 2.1 Watts of constant power to stabilize the sensor for continuous operation. The ADC sound board 210 might require approximately 0.3 Watts of continuous power to meet the program requirements. Thus, the VRSMR 200 might require approximately 5.3 to 7.4 W at 5 V for continuous operation. The energy and power subsystem is designed to have enough capacity to power the VLF subsystem. The entire device weighs less than 1 lb.

Figure 3:
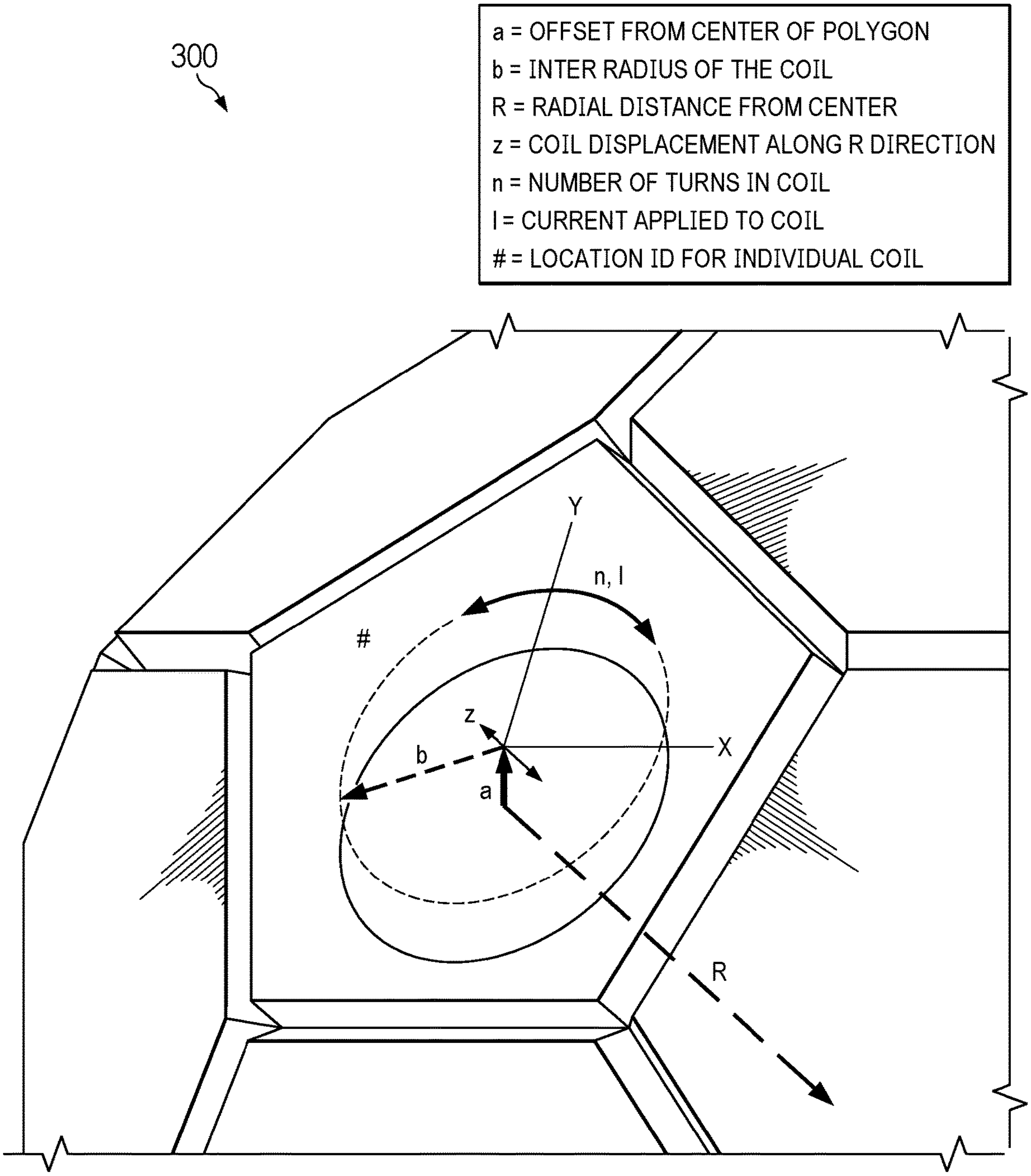
FIG. 3 depicts a diagram illustrating magnetic field optimization in accordance with an illustrative embodiment.

FIG. 3 depicts a diagram illustrating magnetic field optimization in accordance with an illustrative embodiment.

The illustrative embodiments employ a spherical coil driver using a spherical multi-axis array approach to reduce the overall size of the magnetic bias coils and improve bias field uniformity across the Rubidium gas cell in the magnetometer. This approach allows for a smaller device with improved sensitivity over all prior Helmholtz based coil models. This design has a minimum of seven (7) parametric variables. There are six variables per coil including: offset (c) from the center of the polygon (c), inner radius (b) of the coil, radial distance (R) from center, coil displacement (z) along the R direction, the number of turns (n) in the coil, and current (I) applied to the coil. Another variable (#) is used to account for the 30± individual coils patterned over the spherical multi-axis array.

A machine learning (ML) can optimize the shape and size of the coil while maintaining the minimum possible variation of magnetic field strength across the interior of the Rubidium gas cell. The structure can be 3D printed in sections and assembled using wrapped bobbins fitted inside 2D polygons.

FIG. 4 depicts an exploded view of a VRSMR assembly in accordance with an illustrative embodiment. FIG. 5 depicts a pictorial diagram of the closed VRSMR assembly 400.

As shown in the example, inductive coils 406 are fixed over the polygon sections of buckyball frame 402 to form a coil array surrounding the magnetometer 408. At the center of the frame 402 is a chamber 404 configured to accommodate magnetometer 408.

A spacer 412 is configured to fit within chamber 404 and hold magnetometer 408 in place. Closure cap 414 is then placed over the chamber 404 to seal the magnetometer 408 inside the frame 402. As shown in FIG. 5, when closed, VRSMR assembly is approximately spherical due to the buckyball design of the frame 402. Cable 410 protrudes from the closed VRSMR assembly to allow connection to the signal and power subsystems (not shown).

It should be emphasized that the method described above of maintaining a uniform magnetic field across an inductive coil array is not limited to the example of a buckyball frame as shown in FIGS. 2-5. The method of the illustrative embodiments can be applied to a variety of complex arrangements of inductive coils. The magnetic field of a coil array can be designed and tuned through closed loop control according to the specific geometric characteristics of the arrangement in question. For example, the frame for the inductive coil array can comprise an elongated shape with bands of additional pentagons and hexagons oriented around a meridian. Other geometric variants such as tubular shapes can also be implemented in the illustrative embodiments with a concomitant increase in required computational resources.

Figure 6:
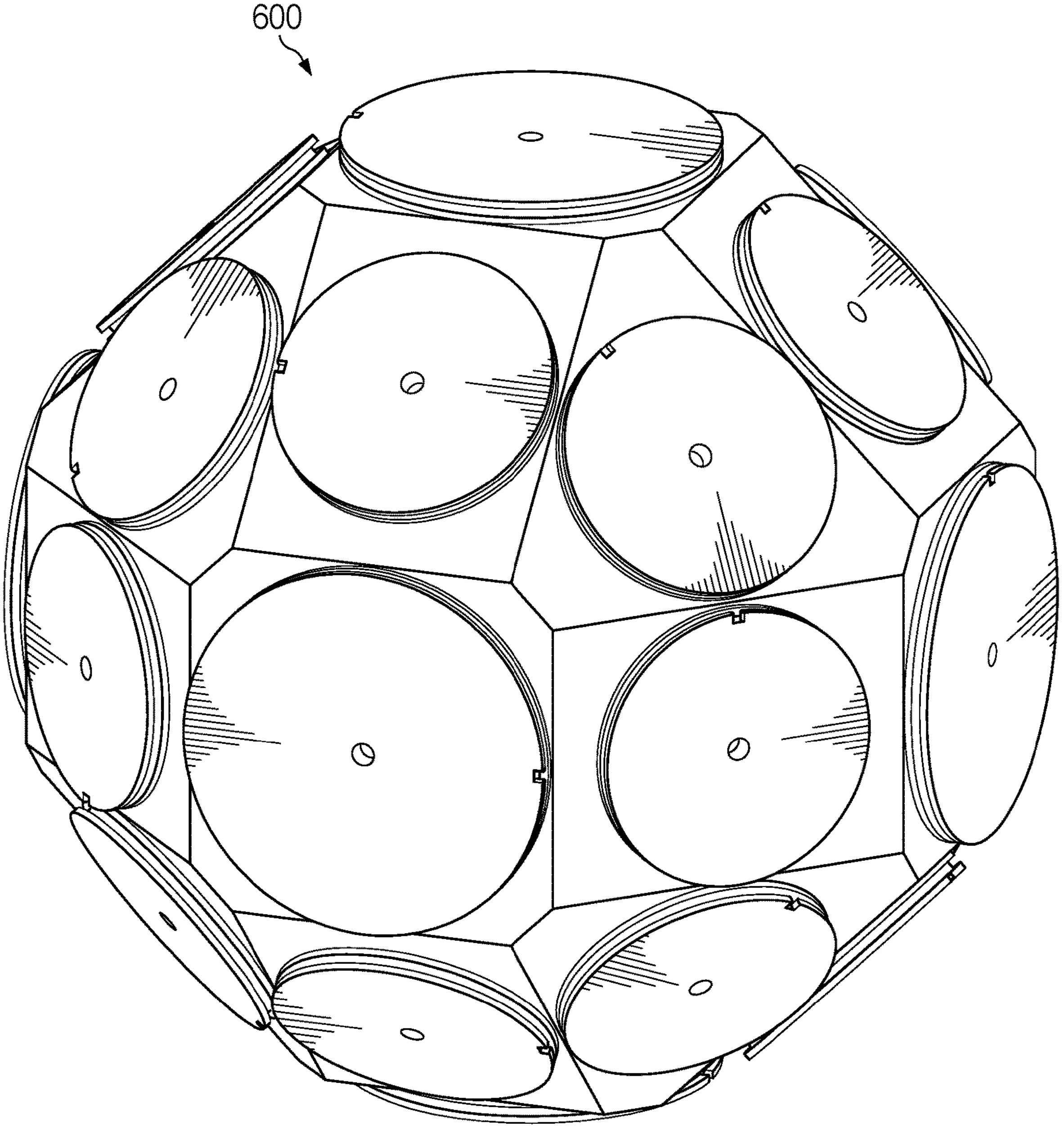
FIG. 6 depicts a pictorial diagram of an alternate VRSMR design in accordance with an illustrative embodiment.

FIG. 6 depicts a pictorial diagram of an alternate VRSMR design in accordance with an illustrative embodiment. In the example, the VRSMR takes the form of a truncated cube deluxe 600. In this arrangement, faces for inductive coils are equidistant from the center of all the Miller indices (i.e., [100], [110], [111], etc.). The truncated cube design 600 has better symmetry for a cube-lattice structure compared to a buckyball but has more inconsistent face shape dimensions. In contrast, the buckyball arrangement has a more uniform spatial arrangement of coil faces, but the face distances are not equidistant from the center. This arrangement allows the VRSMR to better accommodate small variations in the geometric and magnetic properties of individual cells when using the Buckyball configuration over a 3 axis Helmholtz or even a multi-axis coil aligned directly to Miller Indices. Thus, each type of arrangement has advantages and disadvantages that affect the design and closed loop tuning of the coil array magnetic field.

It should be noted that the use of a tuned coil array is not limited to magnetometers and VLF detection. A tuned induction coiled array as described in the examples above can be used in any application that requires a uniform magnetic field in which to detect signals.

Figure 7:
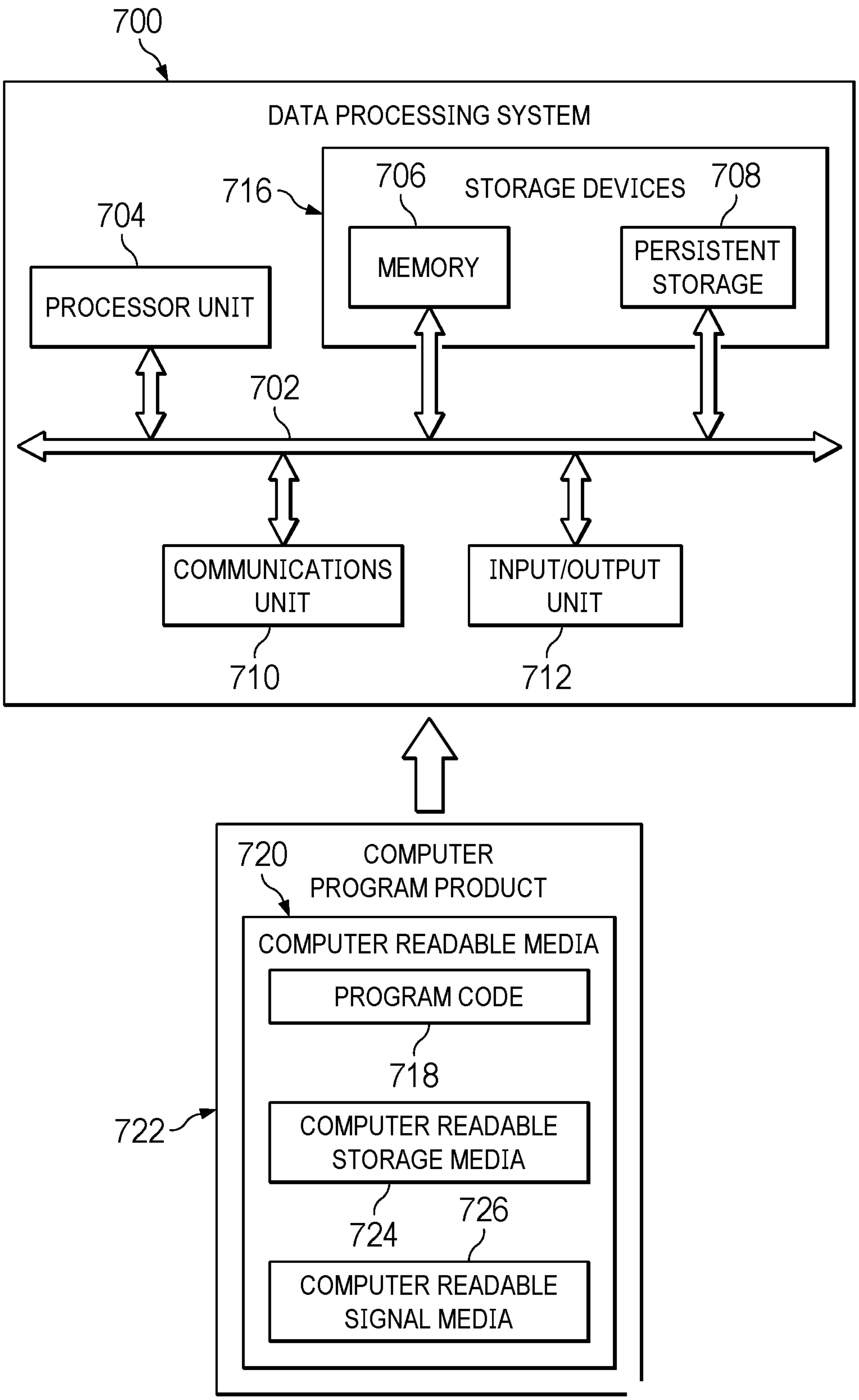
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be an example of SBC 128 in FIG. 1. In this illustrative example, data processing system 700 includes communications framework 702, which provides communications between processor unit 704, memory 706, persistent storage 708, communications unit 710, and input/output (I/O) unit 712. In this example, communications framework 702 takes the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. Persistent storage 708 may include neuromorphic hardware. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Computer readable storage media 724, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

When one component is "connected" to another component, the connection is a physical connection. For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A very low frequency (VLF) receiver, comprising:

a magnetometer that detects a magnetic field, wherein the magnetometer comprises a rubidium gas cell;

processing circuitry that receives an electrical signal representative of VLF electromagnetic signals detected by the magnetometer;

a multi-axis array enclosing the magnetometer, wherein the multi-axis array comprises a number of inductive coils; and a closed loop current controller connected to the inductive coils and running on the processing circuitry, wherein the closed loop current controller controls magnetic field strength of the inductive coils to maintain a uniform magnetic field across the rubidium gas cell to allow the processing circuitry to detect the VLF electromagnetic signals.

2. The VLF receiver of claim 1, wherein the magnetometer comprises a spin exchange relaxation free magnetometer.

3. The VLF receiver of claim 1, wherein the inductive coils comprise three-axis Helmholtz coils that are tuned by the closed loop current controller.

4. The VLF receiver of claim 1, wherein the processing circuitry comprises a single board computer.

5. The VLF receiver of claim 4, wherein the single board computer is configured to run a neuromorphic denoiser to improve signal to noise ratio.

6. The VLF receiver of claim 4, wherein the closed loop current controller runs on the single board computer.

7. The VLF receiver of claim 1, wherein the processing circuitry comprises an analog to digital converter (ADC).

8. The VLF receiver of claim 7, wherein the ADC comprises a high bit resolution sound board that digitizes an analog signal up to 50 KHz.

9. The VLF receiver of claim 1, wherein the closed loop controller employs a machine learning algorithm to optimize operation of more than three inductive coils at once.

10. The VLF receiver of claim 1, wherein the closed loop controller locks the magnetometer.

11. The VLF receiver of claim 1, wherein the closed loop controller tunes the inductive coils.

12. The VLF receiver of claim 1, wherein the closed loop current controller uniformly maintains the uniform magnetic field across the rubidium gas cell by nullifying the Earth's magnetic field and spurious local fields across the interior of the rubidium gas cell.

13. The VLF receiver of claim 1, wherein the multi-axis array is mounted on a buckyball-shaped frame.

14. The VLF receiver of claim 1, wherein the magnetometer and multi-axis array are sealed within a watertight enclosure.

15. A very low frequency (VLF) receiver, comprising:

a magnetometer that detects a magnetic field, wherein the magnetometer comprises a rubidium gas cell;

a buckyball-shaped frame enclosing the magnetometer;

a number of inductive coils mounted on the buckyball shaped frame, wherein the inductive coils form a multi-axis array;

a high bit resolution analog to digital converter (ADC) that receives an electrical signal representative of VLF electromagnetic signals detected by the magnetometer;

a single board computer that receives a digital signal from the ADC and applies a neuromorphic denoising filter to improve signal to noise ratio; and a closed loop current controller connected to the inductive coils and running on the single board computer, wherein the closed loop current controller controls magnetic field strength of the inductive coils to maintain a uniform magnetic field across the rubidium gas cell to allow the ADC to detect the VLF electromagnetic signals.

16. The VLF receiver of claim 15, wherein the magnetometer comprises a spin exchange relaxation free magnetometer.

17. The VLF receiver of claim 15, wherein the closed loop controller employs a machine learning algorithm to optimize operation of more than three inductive coils at once.

18. A multi-axis inductive coil array, comprising:

a number of inductive coils; and a closed loop current controller connected to the inductive coils, wherein the closed loop current controller controls magnetic field strength of the inductive coils to maintain a uniform magnetic field within the multi-axis array.

19. The multi-axis array of claim 18, wherein the closed loop current controller runs on a single board computer.

20. The multi-axis array of claim 18, wherein the closed loop controller employs a machine learning algorithm to optimize operation of more than three inductive coils at once.

* * * * *